United States Patent
Ohtomo et al.

(10) Patent No.: US 7,552,025 B2
(45) Date of Patent: Jun. 23, 2009

(54) POSITION DATA INTERPOLATION METHOD, POSITION DETECTING SENSOR AND POSITION MEASURING DEVICE

(75) Inventors: Fumio Ohtomo, Itabashi-ku (JP); Hitoshi Otani, Itabashi-ku (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 0 days.

(21) Appl. No.: 11/635,116

(22) Filed: Dec. 7, 2006

(65) Prior Publication Data

US 2007/0167154 A1    Jul. 19, 2007

(30) Foreign Application Priority Data

Dec. 22, 2005    (JP)    ............... 2005-370867

(51) Int. Cl.
  G06F 15/00    (2006.01)
  G01C 17/00    (2006.01)
(52) U.S. Cl. ................ 702/150; 702/161; 702/152; 702/153; 348/143
(58) Field of Classification Search ......... 702/188–191, 702/150–153, 155–159; 348/48, 143, 148, 348/150; 701/200; 382/103, 284
See application file for complete search history.

(56) References Cited

U.S. PATENT DOCUMENTS 5,166,878 A  *  11/1992  Poelstra ................... 701/200
2004/0076340 A1  *  4/2004  Nielsen ..................... 382/284
2007/0081695 A1  *  4/2007  Foxlin et al. .............. 382/103

FOREIGN PATENT DOCUMENTS

JP    2001-317915    11/2001

* cited by examiner

Primary Examiner—Eliseo Ramos Feliciano
Assistant Examiner—Phuong Huynh
(74) Attorney, Agent, or Firm—Nields, Lemack & Frame, LLC

(57) ABSTRACT

A position data interpolation method, comprising: continuously taking digital images of scenes in the surrounding in a process of moving from a first point, which is a known point, via a second point, which is a known point, to a third point, which is an unknown point; generating tracking points from an image acquired at the first point, and sequentially specifying the tracking points through the pursuit of points generated on continuously acquired images; obtaining 3-dimensional position data of the tracking points based on a result of orientation of the tracking points at the first point and at the second point and based on position data of the first point and the second point; and sequentially obtaining a position of the third point based on a result of orientation of the tracking points acquired at the third point and based on 3-dimensional position data of the tracking points.

9 Claims, 7 Drawing Sheets

—————— METHOD OF INTERSECTION
---------- METHOD OF RESECTION

POSITION DATA INTERPOLATION METHOD, POSITION DETECTING SENSOR AND POSITION MEASURING DEVICE

BACKGROUND OF THE INVENTION

The present invention relates to a position data interpolation method, a position detecting sensor, and a position measuring device in case position measurement cannot be performed by using GPS (Global Positioning System).

In recent years, position measurement using GPS has become widespread. For example, when civil engineering work is carried out by using civil engineering equipment such as a bulldozer, a working position, i.e. a position of the bulldozer, is measured by using a GPS, and confirmation of the working position and the like are performed. Or, as in a car navigator, an electronized map information is linked with position data of a mobile object obtained by using the GPS, and a present position is reflected on an electronic map and is turned to an image, and this is displayed on an image display device. In this way, it is possible to measure a position of a mobile object at real time.

However, an electric wave from a satellite is used in the position measurement by using GPS. In case the electric wave from the satellite is interrupted by an obstacle, e.g. by a mountain, a building, etc., there is a place (shade) where the electric wave does not reach. Or, as in a case of a car navigator, when a position measuring range cannot be determined, there is a portion of the shade.

In the past, in a zone where position measurement cannot be performed by using GPS, it is necessary to add surveying operation by human power using surveying instrument as in the conventional case, and the operation must intermittently performed.

Also, on a device such as a car navigator installed on a mobile object, position measurement has not been achievable in a portion of the shade, and sufficient functions have not been fulfilled as a position measuring device.

SUMMARY OF THE INVENTION

It is an object of the present invention to provide a position data interpolation method, a position detecting sensor and a position measuring device, by which it is possible to continuously perform position measurement even on a portion in shade by using a single GPS position detecting device without interrupting the position measuring operation.

To attain the above object, the present invention provides a position data interpolation method, which comprises: a step of continuously taking digital images of scenes in the surrounding in a process of moving from a first point, which is a known point, via a second point, which is a known point, to a third point, which is an unknown point; a step of generating tracking points from an image acquired at the first point, and sequentially specifying the tracking points through the pursuit of points generated on continuously acquired images; a step of obtaining 3-dimensional position data of the tracking points based on a result of orientation of the tracking points at the first point and at the second point and based on position data of the first point and the second point; and a step of sequentially obtaining a position of the third point based on a result of orientation of the tracking points acquired at the third point and based on 3-dimensional position data of the tracking point. Also, the present invention provides a position data interpolation method, comprising: a step of continuously taking digital images of scenes in the surrounding in a process of moving from a first point, which is a known point, via a second point, which is a known point, to a third point, which is an unknown point; a step of generating tracking points from an image acquired at the first point, and sequentially specifying the tracking points through the pursuit of points generated on continuously acquired images; a step of obtaining 3-dimensional data of the tracking points on the image acquired at the first point and the image acquired at the second point according to position data of the first point and of the second point, performing relative orientation between the image acquired at the first point and the image acquired at the second point based on the tracking points, and turning to stereo images with 3-dimensional data respectively; and a step of obtaining position data of the third point based on position data of the stereo image and turning the third point to a known point. Further, the present invention provides the position data interpolation method as described above, wherein position information are measured by a GPS position detecting device at least on the first point and on the second point. Also, the present invention provides the position data interpolation method as described above, wherein position information of the tracking points is obtained based on known information of the first point and of the second point by the method of intersection, and position information of the third point is obtained based on 3-dimensional position data of the tracking points in the image by the method of resection. Further, the present invention provides the position data interpolation method as described above, wherein images in two or more directions are continuously acquired, and the tracking points are generated in images at least in one direction. Also, the present invention provides the position data interpolation method as described above, wherein a retrieval range is set up with the tracking points in a preceding image as the center on a next image data which is acquired subsequently in order of time, and the tracking points in the next image are retrieved within the retrieval range. Further, the present invention provides the position data interpolation method as described above, wherein back-matching is performed on the tracking points of a preceding image data by using as retrieval target the tracking points specified in a next image which is acquired subsequently in order of time, and the tracking points are deleted in case the tracking points obtained by back-matching do not agree with the tracking points already obtained in the preceding image. Also, the present invention provides the position data interpolation method as described above, wherein an interval of image acquisition is determined to match the moving speed so that the tracking points of the next image are included within the retrieval range.

Further, the present invention provides a position detecting sensor, which comprises a GPS position detecting device, at least one image pickup device for continuously taking digital images, and an azimuth sensor for detecting an image pickup direction of the image pickup device, wherein at least the position measurement data by the GPS position detecting device and the image at the time of position measurement can be synchronized and output.

Also, the present invention provides a position measuring device, which comprises a GPS position detecting device, at least one image pickup device for continuously taking digital images, an azimuth sensor for detecting an image pickup direction of the image pickup device, and a measuring device main unit, wherein the GPS position detecting device measures position data of a first point and of a second point, the image pickup device continuously takes digital images of scenes in the surrounding in a process of moving from a first point, which is a known point, via a second point, which is a known point, to a third point, which is an unknown point, and wherein the measuring device main unit generates tracking points from the image obtained at the first point, sequentially specifies the tracking points through the pursuit of points generated on the continuously acquired images, calculates 3-dimensional data of the tracking points of the image acquired at the first point and the image acquired at the second point based on position data of the first point and the second point, and calculates position data of the third point based on the position data of the tracking points. Further, the present invention provides the position measuring device, further comprising a total circumferential mirror and an image correcting means, wherein the image pickup device can take images in total circumferential direction in horizontal direction via the total circumferential mirror, and the images taken are corrected by the image correcting means.

According to the present invention, a position data interpolation method comprises a step of continuously taking digital images of scenes in the surrounding in a process of moving from a first point, which is a known point, via a second point, which is a known point, to a third point, which is an unknown point; a step of generating tracking points from an image acquired at the first point, and sequentially specifying the tracking points through the pursuit of points generated on continuously acquired images; a step of obtaining 3-dimensional data of the tracking points based on a result of orientation of the tracking points at the first point and at the second point and based on position data of the first point and the second point; a step of sequentially obtaining a position of the third point based on a result of orientation of the tracking points acquired at the third point and based on 3-dimensional position data of the tracking points. As a result, it is possible to perform position measurement of the third point and to measure unknown points sequentially by turning the third point to a known point.

Also, according to the present invention, a position data interpolation method comprises: a step of continuously taking digital images of scenes in the surrounding in a process of moving from a first point, which is a known point, via a second point, which is a known point, to a third point, which is an unknown point; a step of generating tracking points from an image acquired at the first point, and sequentially specifying said tracking points through the pursuit of points generated on continuously acquired images; a step of obtaining 3-dimensional data of the tracking points on the image acquired at said first point and the image acquired at the second point according to position data at the first point and at the second point, performing relative orientation between the image acquired at the first point and the image acquired at the second point based on the tracking points, and turning to stereo images with 3-dimensional data respectively; and a step of obtaining position data of the third point based on position data of the stereo image and turning the third point to a known point. Thus, it is possible to perform position measurement of the third point and to measure unknown points sequentially by turning the third point to a known point.

Further, according to the present invention, a position detecting sensor comprises a GPS position detecting device, at least one image pickup device for taking continuously digital images, and an azimuth sensor for detecting image pickup direction of the image pickup device, and at least position measurement data by the GPS position detecting device and the image at the time of position measurement can be synchronized and output. As a result, it is possible to acquire the position data by associating with the pickup image.

Also, according to the present invention, a position measuring device comprises a GPS position detecting device, at least one image pickup device for continuously taking digital images, an azimuth sensor for detecting an image pickup direction of the image pickup device, and a measuring device main unit, and the GPS position detecting device measures position data of a first point and of a second point, the image pickup device continuously takes digital images of scenes in the surrounding in a process of moving to a third point, which is an unknown point, and the measuring device main unit generates tracking points from the image obtained at the first point, sequentially specifies the tracking points through the pursuit of points generated on the continuously acquired images, calculates 3-dimensional data of the tracking points of the image acquired at the first point and image acquired at the second point based on position data of the first point and the second point, and calculates position data of the third point based on the position data of the tracking points. Thus, even when it is not possible to measure by the GPS position detecting device, an unknown point can be measured without interrupting the operation.

Further, according to the present invention, the position measuring device as described above further comprises a total circumferential mirror and an image correcting means, and the image pickup device can take images in total circumferential direction in horizontal direction via the total circumferential mirror, and the images taken are corrected by the image correcting means. Thus, it is possible to acquire the image data in wide range associated with the position data by a single image pickup device.

DETAILED DESCRIPTION OF THE PREFERRED EMBODIMENT

Description will be given below on the best mode for carrying out the present invention referring to the attached drawings.

The present invention relates to position measurement of a mobile object. A position measuring device is installed on the mobile object. The position measuring device moves together with the mobile object, and position measurement is performed at real time.

First, description will be given on the position measuring device of the present invention by referring to FIG. 1 and FIG. 2.

Figure 1:
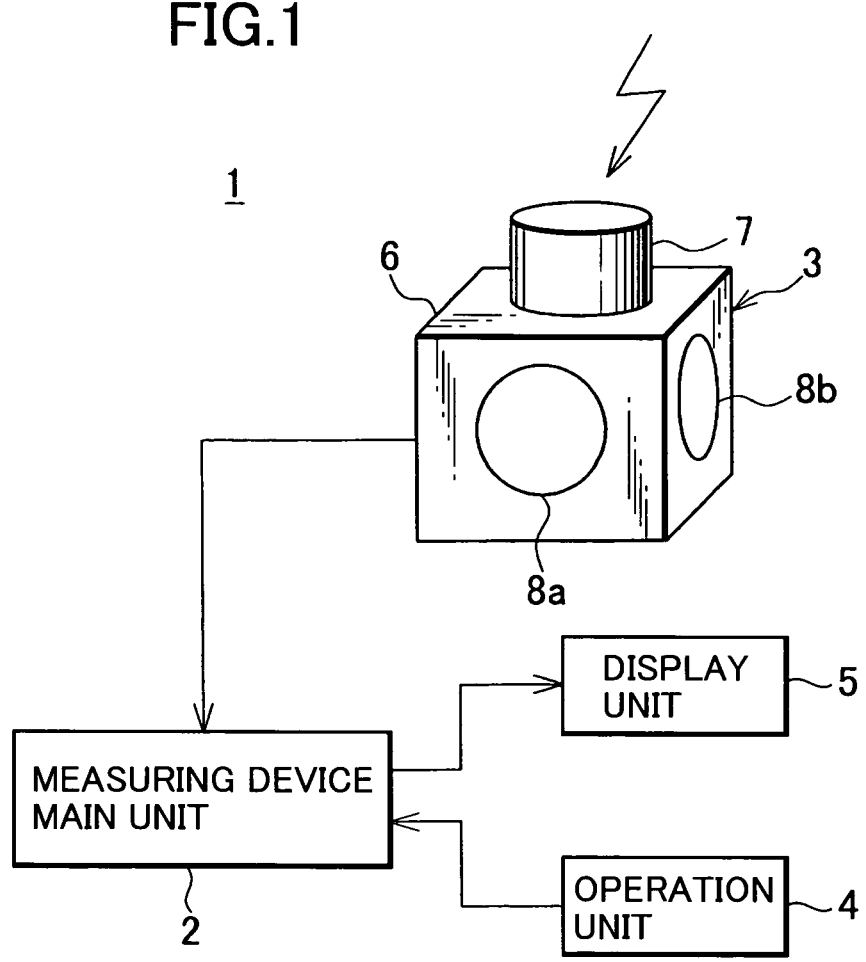
FIG. 1 is a schematical drawing of a position measuring device according to an embodiment of the present invention.

FIG. 1 shows general features of a position measuring device 1. The position measuring device 1 primarily comprises a measuring device main unit 2, a position detecting sensor 3, an operation unit 4, and a display unit 5. The position detecting sensor 3 is installed at a position with good outlook on a roof, etc. above a driver's compartment in a mobile object 9 such as a bulldozer, an automobile, etc. The measuring device main unit 2, the operation unit 4, and the display unit 5 are installed at a position, e.g. in a driver's compartment where an operator or a driver can operate and visually recognize the measuring device main unit 2, the operation unit 4 and the display unit 5. The operation unit 4 may be designed as a touch panel, etc. and may be integrated with the display unit 5.

Figure 2:
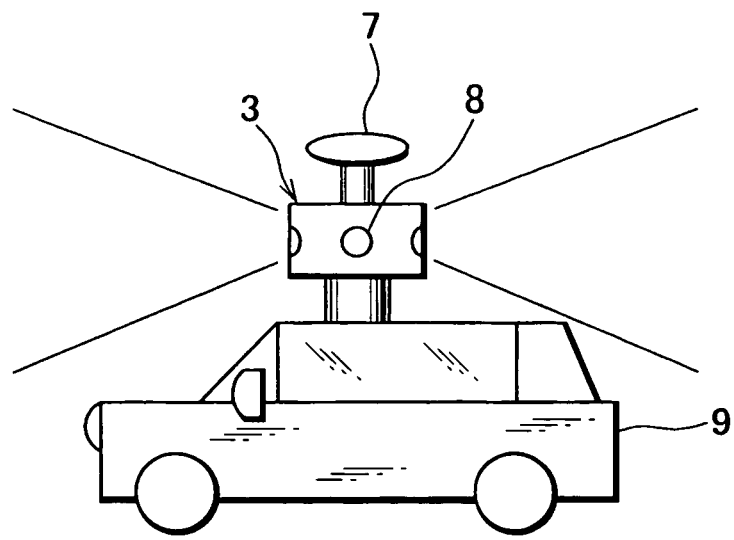
FIG. 2 is a drawing to explain a condition where the embodiment of the present invention is carried out.

FIG. 2 shows a case where the position detecting sensor 3 is installed on a roof of an automobile as an example of the mobile object 9.

The position detecting sensor 3 comprises a GPS position detecting device 7 installed on an upper surface of a sensor main unit 6, image pickup devices 8a, 8b, 8c and 8d (hereinafter generally referred as "image pickup device 8"), and an azimuth sensor 10. The image pickup device 8a, 8b, 8c and 8d are, for instance, digital cameras which are mounted on side surfaces of the sensor main unit 6 and facing in 4 directions, and which can output a picked-up image as digital image data. The image pickup device 8 comprises image pickup elements containing a multiple of pixels such as CCD sensors, CMOS sensors, etc. One frame of image data has an aggregation of signals of each image pickup elements. By specifying the image pickup element to match the signal, a position in the image can be specified. Also, mechanical relation between the image pickup device 8 and the azimuth sensor 10 is fixed. When the azimuth is detected by the azimuth sensor 10, the image pickup direction (azimuth) of each image pickup device 8 can be uniquely determined.

Figure 3:
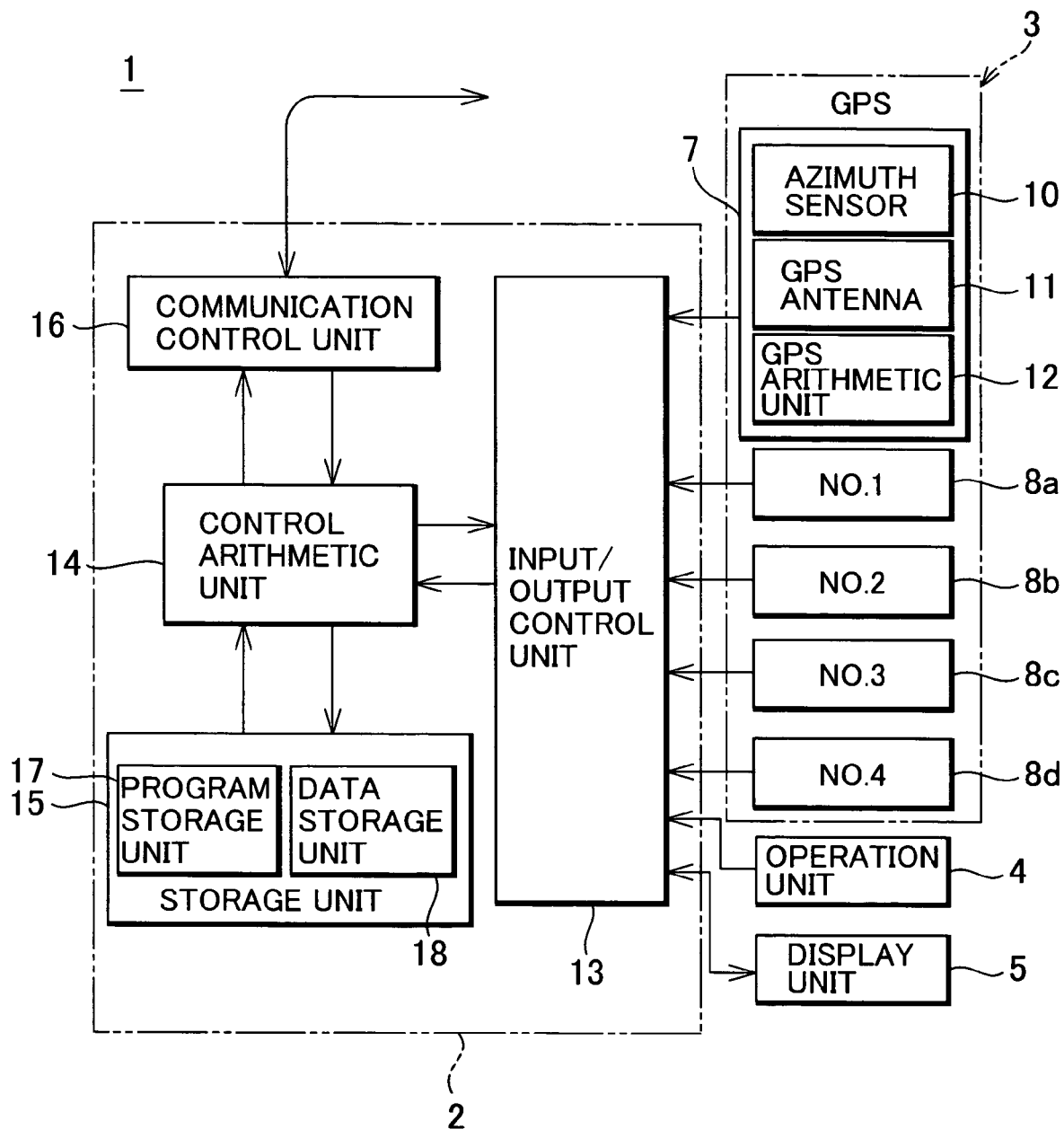
FIG. 3 is a schematical block diagram of a position measuring device according to the embodiment of the present invention.

The GPS position detecting device 7 comprises a GPS antenna 11 and a GPS arithmetic unit 12 (see FIG. 3). Signals from a plurality of satellites are received by the GPS antenna 11. Based on the results of the received signals, the GPS arithmetic unit 12 calculates a distance between the satellite and a receiving point according to 3-dimensional geometry, and 3-dimensional position measurement is performed. As the position measurement, single position measurement, interference position measurement, etc. are known. It is preferable to adopt RTK (real-time kinematic) position measurement, by which it is possible to perform position measurement within short time and while moving.

By the image pickup devices 8, it is possible to acquire images over the total circumference. To match an image pickup angle (image pickup range) of the image pickup device 8, 3 or 5 or more of image pickup devices 8 are installed. Or, one image pickup device 8 may be rotated in a horizontal direction, and images may be taken for each rotation angle as required, and the scenes over the total circumference can be acquired by the image pickup device 8.

Or, two image pickup devices 8 may be provided so that the scenes in two directions perpendicularly crossing the advancing direction of the mobile object 9 can be taken. In this case, the image pickup angle may be within an adequate range, and the image pickup angle does not need to be 180°.

The image pickup devices 8a, 8b, 8c and 8d take images with a predetermined time interval in synchronization with each other. Position measurement by the GPS position detecting device 7 is performed in synchronization with the image pickup or in synchronization with a time interval which is given by multiplaying the image pickup time interval by required times. Image data of the pickup images and position data obtained by the position detecting sensor 3 when the images are taken are sent to the measuring device main unit 2. The time interval of image pickup of the image pickup device 8 is determined in such a manner that most of the images are overlapped each other between the previous image and the current image and continuity between each images is not impaired as a whole. When the mobile object 9 moves at high speed, the time interval should be shortened. When the mobile object 9 moves at lower speed, the time interval may be longer. Or, the time interval for the image pickup may be fixedly set up to match the maximum speed of the mobile object 9. The time interval of the image pickup may be set up to match the maximum speed of the mobile object 9, and the image data to be sent to the measuring device main unit 2 may be thinned out match the speed.

Now, description will be given on the measuring device main unit 2 by referring to FIG. 3.

The measuring device main unit 2 generally comprises an I/O control unit 13, a control arithmetic unit 14 represented by a CPU, a storage unit 15 represented by a HD or the like, a communication control unit 16, etc.

As the storage unit 15, a memory card, a HD, a FD, a MO, etc. may be used. These are provided as a built-in component or in removable type. The storage unit 15 has a program storage area 17 and a data storage area 18. In the program storage area 17, the following programs and the like are stored: a sequence program for controlling operation of the device, an image processing program for extracting a tracking point from the acquired image, a calculation program for performing image matching between a plurality of images and for tracking the tracking point between a plurality of images, a surveying program for calculating a position of an unknown point in the image by the method of intersection according to two 3-dimensional position data obtained by the position detecting sensor 3 and for calculating a position of the position detecting sensor 3 by the method of resection according to at least two known points in each of two images, a transmission control program for transmitting the obtained measurement results to an external device such as a data collecting device, and a display program for displaying the results of position measurement on the display unit 5.

In the data storage area 18, there are stored the image data acquired at the image pickup device 8 and position data of the position detecting sensor 3 when the image data have been taken. The position data is associated with the image data, and the image data are the data of time series.

Description will be given on operation by referring to FIG. 4 to FIG. 8.

Figure 4:
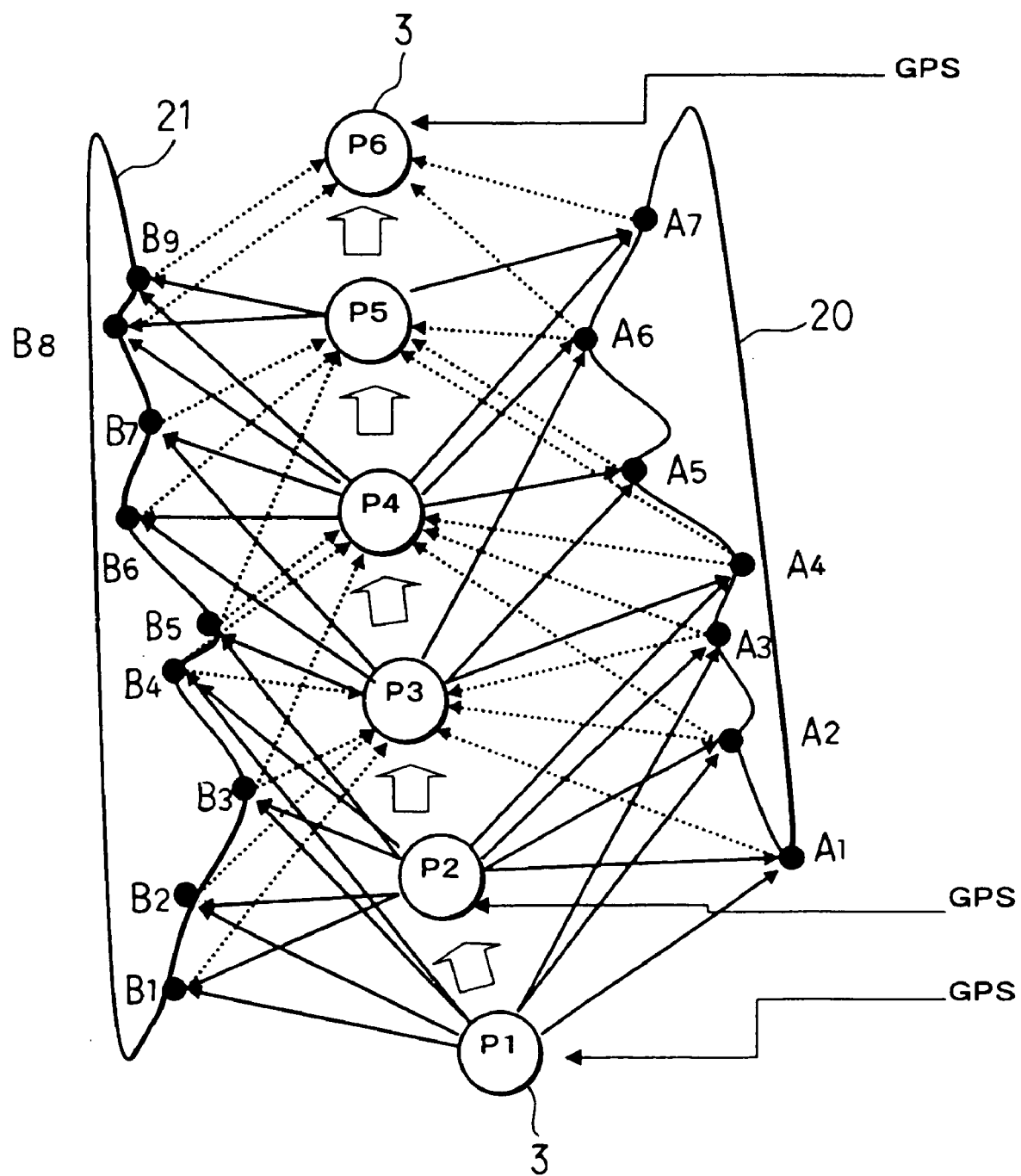
FIG. 4 is a drawing to explain a condition of measurement in the embodiment of the present invention.

FIG. 4 shows a condition where the mobile object 9 advances between an obstacle 20 and an obstacle 21 and the position detecting sensor 3 moves from a first point (point P1) to a sixth point (point P6) (hereinafter, the point P is briefly referred as "P"). At P1 and P2, signals from a satellite can be received by the GPS antenna 11. At P3 to P5, signals from a satellite cannot be received due to the obstacles 20 and 21. At P6, signals from a satellite can be received again.

During the moving of the mobile object 9, images in the surrounding are continuously taken by the image pickup devices 8. Each point P represents a position of the mobile object 9 for each preset time interval.

When the mobile object 9 comes to P1, the control arithmetic unit 14 acquires a position data measured by the GPS position detecting device 7. At the same time, the image data taken by the image pickup device 8 is acquired, and the image data are stored in the data storage area 18 together with the position data. The control arithmetic unit 14 checks whether position data is inputted or not from the GPS position detecting device 7 for each point P. As described later, depending on whether the position data is inputted or not from the GPS position detecting device 7 at each point P, it is judged and selected whether the position measurement at each point P is the measurement by the position detecting sensor 3 or it is the measurement through calculation by the method of intersection or by the method of resection based on the image data, and the measurement is executed.

Description will be given below on the acquisition of images of scenes on the right side and of the obstacle 20, and on position measurement based on the images.

Figure 5:
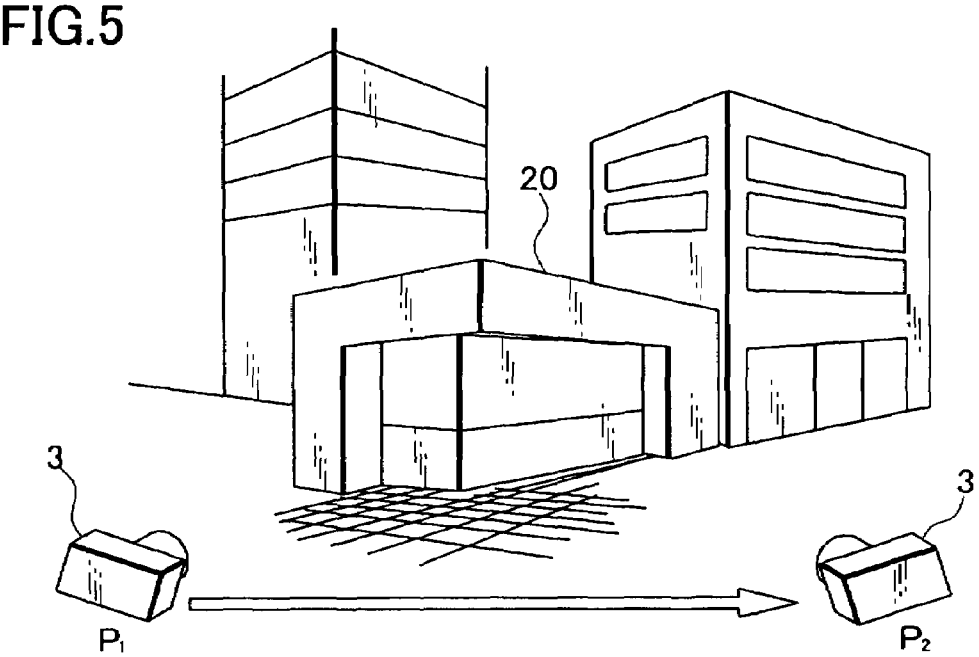
FIG. 5 is a perspective view to explain a condition of image pickup in the position measuring device.
Figure 6A:
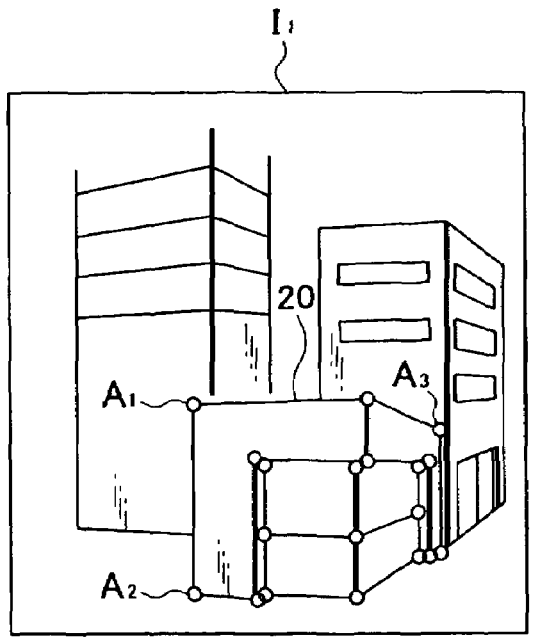
FIG. 6(A) and FIG. 6(B) each represents a perspective view to show an image obtained.
Figure 6B:
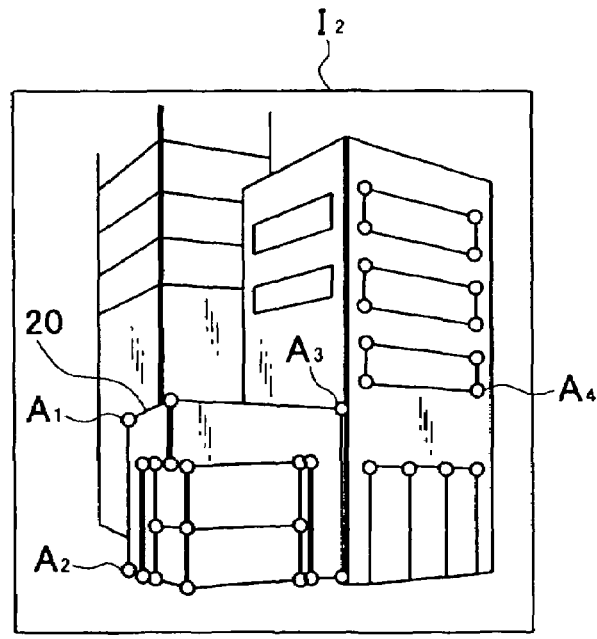

An image $I_1$ taken at P1 in FIG. 5 is shown in FIG. 6(A), and an image $I_2$ at P2 continuously taken while moving from P1 to P2 is shown in FIG. 6(B).

The control arithmetic unit 14 associates the image data $I_1$ at P1 with the measured position data at P1 and the result is stored in the data storage area 18. The control arithmetic unit 14 performs image processing such as edge processing on the image data $I_1$ at P1 in accordance with the image processing program, and corner points or cross-points, which are characteristic points in the image, are extracted as many as required as tracking points (A1, A2, A3, . . . ) (indicated by open circles in FIG. 6(A)) (Step 01). The tracking points are extracted so that these are dispersed all over the image.

Here, the azimuth of the center of the image data $I_1$ from P1 is obtained based on the azimuth detected by the azimuth sensor 10. The azimuth of each of the tracking points (A1, A2, A3 . . . ) from P1 is calculated based on the position of the pixel in the image data $I_1$ (position on the image pickup element with respect to the image pickup center).

In the process from P1 to P2, images are continuously taken by the image pickup devices 8. Tacking points generated in each image are pursued (tracked) between the adjacent images (Step 02).

Now, description will be given on the pursuit (tracking).

A position of the tracking point which is set up as an object of pursuit on the image pickup element is stored as a position of retrieval center. On the next image data acquired subsequently in order of time, the tracking point is retrieved in the next image data over the retrieval range which is set with the retrieval center position as the center. As described above, the images are continuously taken during the movement, and deviation between the preceding image data and the next image data is very slight. The tracking point is present within the retrieval range of the next image data, and the tracking point in the next image data can be immediately specified. For the retrieval within the retrieval range, SSDA (Sequential Similarity Detection Algorithm) method or area correlation method, etc. is used.

Using the tracking point specified in the next image data as retrieval object, the tracking point of the preceding image data is checked by reverse retrieval (back-matching). When the tracking point obtained by the back-matching does not agree with the tracking point already obtained, the tracking point is deleted. By carrying out the back-matching, the shade (occlusion) or the obstacle can be avoided. When tracking points of 3 or more image data have been obtained, duplicated coordinate checking is executed by bundle adjustment calculation based on a plurality of images, and the tracking points with lower accuracy are deleted. By deleting the tracking points with lower accuracy, the accuracy to specify the tracking points is improved as a whole.

The preceding image data is compared with the next image data, and the tracking points as described above are sequentially retrieved in time series.

The extraction of the tracking points by image processing and the pursuit of the tracking points are continuously carried out regardless of whether the position data is inputted or not from the position detecting sensor 3 at each point P. The image data in the past, for which the pursuit of the tracking points has been completed (image data taken between the points P) may be deleted for the purpose of reducing the storage amount.

Next, for P2, position measurement data from the position detecting sensor 3 is inputted, and the position measurement data and an image $I_2$ taken at P2 are stored in the data storage area 18. Image processing is performed on the image $I_2$, and the tracking points (A1, A2, A3 . . . ) are respectively specified by tracking. Azimuth of each of the tracking points (A1, A2, A3 . . . ) with respect to P2 at that moment is calculated according to detection of azimuth of the image pickup direction by the azimuth sensor 10 and according to the position (field angle) of each of the tracking points (A1, A2, A3 . . . ) in the image $I_2$ (see FIG. 7(A)).

Next, based on the position data of P1 and P2, which are known points, and based on the azimuth angle of each of the tracking points (A1, A2, A3 . . . ) with respect to P1 and P2, 3-dimensional position data of each of the tracking points (A1, A2, A3 . . . ) are calculated by the method of intersection (Step 03).

As the result of calculation, the tracking points (A1, A2, A3 . . . ) are turned to the known points. The position data of the each of the tracking points (A1, A2, A3 . . . ) are associated with the image data of the image $I_1$ and the image $I_2$ and are stored in the data storage area 18. Regarding the tracking points as tracking points (A1, A2, A3 . . . ), relative orientation of the image $I_1$ and the image $I_2$ is performed, and the image $I_1$ and the image $I_2$ are turned to images including 3-dimensional data (stereo images).

When the mobile object 9 moves to P3, electric wave from the satellite is cut off by the obstacle 20, and the position measurement data by the position detecting sensor 3 is not inputted. When it is judged that there is no input from the position detecting sensor 3, the control arithmetic unit 14 switches over to the position measurement by the calculation according to the method of resection.

In the process up to P3, the image pickup by the image pickup devices 8 and the pursuit of the tracking points in the image data are continuously performed (Step 04).

Figure 7A:
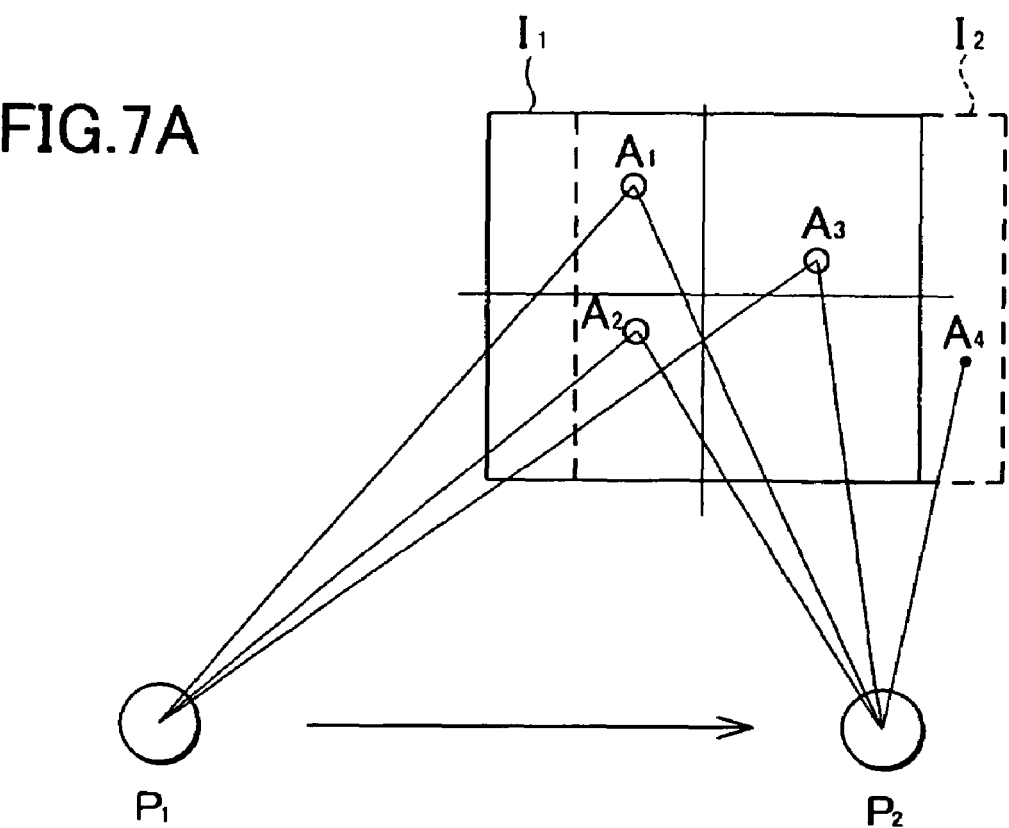
FIG. 7(A) is a drawing to explain position measurement of tracking points by the method of intersection on an image obtained.
Figure 7B:
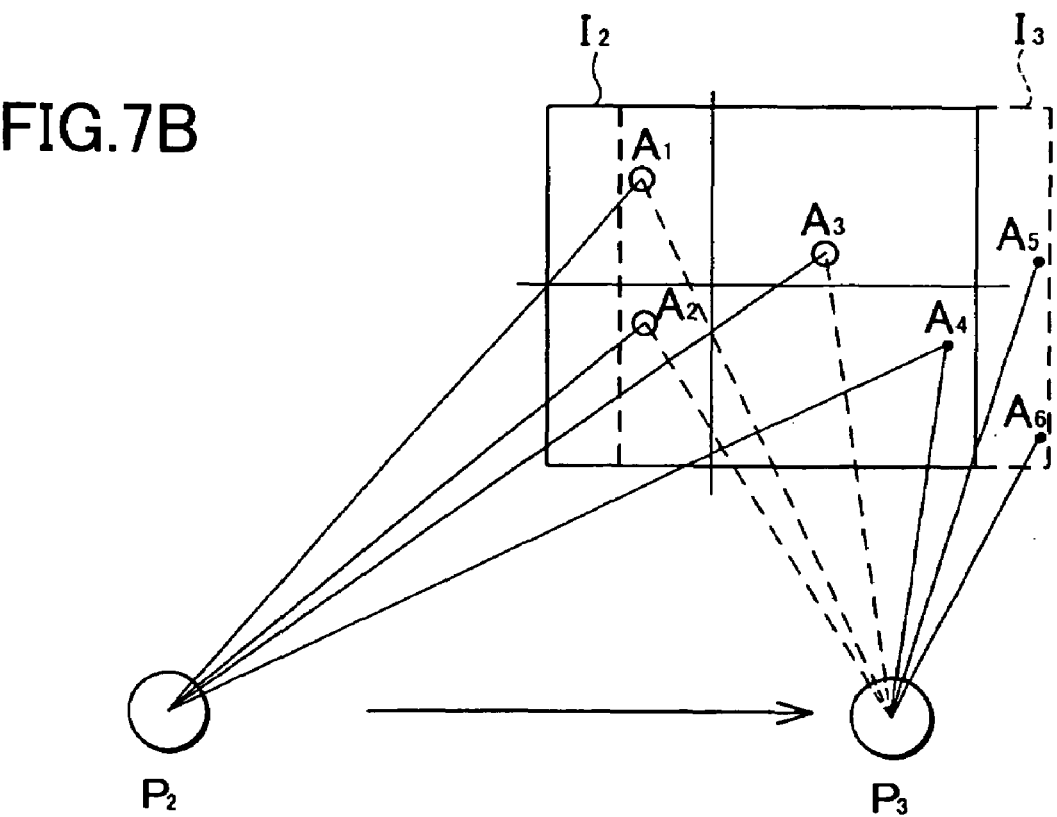
FIG. 7(B) is a drawing to explain position measurement of an image pickup point by the method of resection according to an image obtained.
Figure 8:
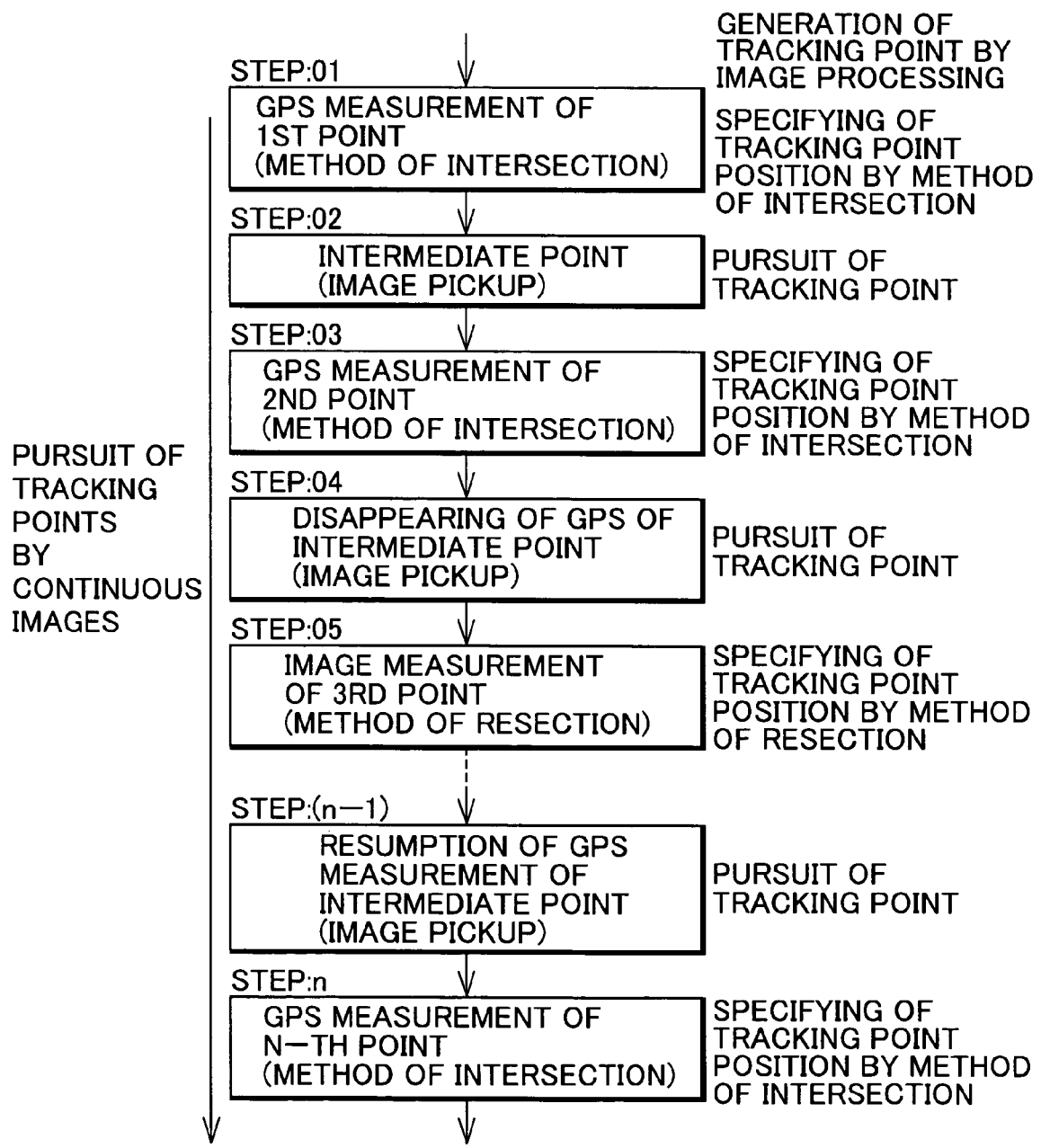
FIG. 8 is a flow chart to show operation in the embodiment of the present invention.

Specifically, based on the position data of each of the tracking points (A1, A2, A3 . . . ) already obtained and azimuth data of the tracking points (A1, A2, A3 . . . ) in the image $I_3$ acquired at P3 and azimuth of P3 (azimuth of the image pickup direction and field angle), position data of P3 is calculated by the method of resection (Step 05; see FIG. 7(B)).

When the mobile object 9 is moved from P1 to P2, P3, . . . and the image pickup range is shifted, new tracking points are generated one after another in the image taken. For instance, referring to FIG. 7(A) and FIG. 7(B), a tracking point A4 is generated in the image $I_2$, and tracking points A5 and A6 are generated in the image $I_3$. Pursuit is also performed on the newly generated tracking points (Step n−1). Further, position data are calculated and measured sequentially by the method of intersection.

By the method of resection, P3 is turned to a known point. Based on the position data of P3 and P2 and based on azimuth data with respect to the newly generated tracking points from P3 and P2, the positions of the newly generated tracking points are calculated by the method of intersection (Step n).

Based on the position data of the tracking points in the image, the position of Pn is calculated and measured by the method of resection. Further, based on the data of P (n−1) and Pn, which have been turned to known data, positions of the newly generated tracking points are calculated and measured by the method of intersection according to the image. Thus, even when electric wave from the satellite is not obtained and the position measurement of P by the position detecting sensor 3 cannot be performed, the position measurement of P is continuously achievable by alternately performing the method of intersection and the method of resection.

Next, when the mobile object 9 reaches P6, the electric wave from the satellite can be received. The position of P6 is measured by the position detecting sensor 3. When the position data measured by the position detecting sensor 3 is inputted to the control arithmetic unit 14, the control arithmetic unit 14 judges that the position data has been inputted, and the calculation by the method of resection is stopped. The image data taken at P6 by the image pickup devices 8, data of the tracking points extracted from the image data, and azimuth data of the extracted tracking points are associated with the position data of P6 and are stored in the data storage area 18.

Accordingly, while the position information are inputted from the position detecting sensor 3, the results measured by the position detecting sensor 3 are adopted as the data of position measurement of P. When the position information from the position detecting sensor 3 are interrupted, the position data of P calculated by the method of intersection and the method of resection are adopted. Thus, the position of P is continuously measured without being interrupted.

In case position measurement cannot be achieved by the position detecting sensor 3, it will suffice if the data of image and tracking points are available on three P's, i.e. the newest value Pn and two values of P(n−1) and P(n−2) obtained in the past. The data of P(n−3) and the older may be erased sequentially to reduce the storage amount.

For the position data of the tracking points, based on the required number of tracking points pursued, images (stereo image) including 3-dimensional data are obtained with respect to two adjacent measuring points, e.g. P2 and P3 through relative orientation using the pass point based on the tracking point on the images acquired at P2 and P3. Then, by using the images, it is possible to obtain position data and azimuth data of each of the pixels which constitute other images, and calculation processing can be performed at higher speed.

In the description as given above, images are taken on the obstacle on the right side of the mobile object 9 and position measurement of P is conducted. In case it is impossible to acquire an adequate image to obtain the tracking point from the obstacle on the right side, an image may be acquired from the obstacle on the left side. The image to be acquired can be adequately selected in the stage of image processing, depending on the conditions of the obstacle.

Figure 9:
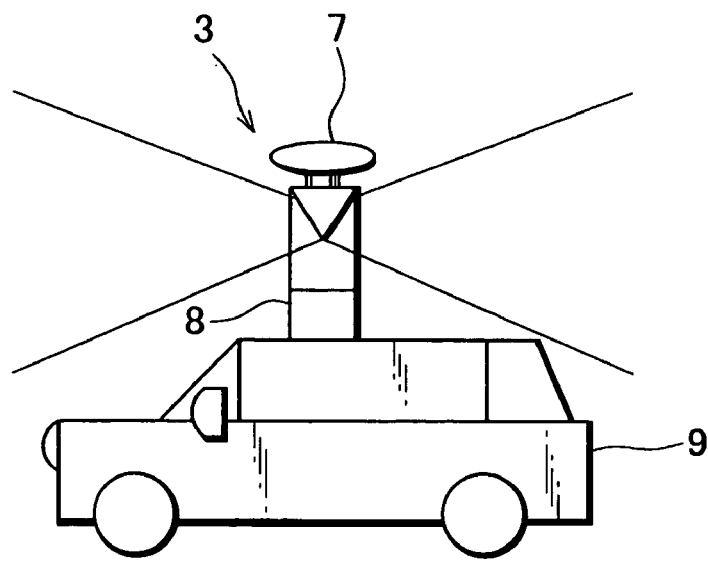
FIG. 9 is a drawing to explain another aspect of a position detecting sensor according to the present invention.
Figure 10:
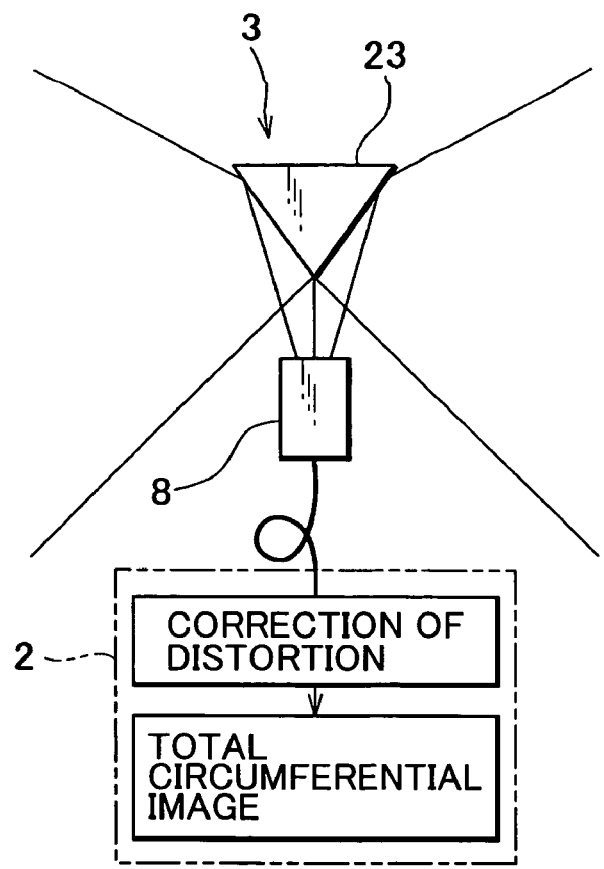
FIG. 10 is a schematical block diagram of the position sensor.

FIG. 9 and FIG. 10 each represents other conditions of the position detecting sensor 3.

The position detecting sensor 3 is installed on the mobile object 9, e.g. at a position with good outlook to the surrounding such as a position on a roof of an automobile.

The position detecting sensor 3 comprises an image pickup device 8 and a conical mirror 23 which has its central line aligned with an optical axis of the image pickup device 8 so that an image can be taken via the conical mirror 23. Because an image can be taken via the conical mirror 23, the image pickup device 8 can take images over total circumference. The image data are sent to the measuring device main unit 2. The data storage area 18 has a distortion correction program. The control arithmetic unit 14 corrects the distortion of the image thus sent and turns the image to a total circumferential image without distortion, and this is stored in the data storage area 18.

Also, for the case where the total circumferential image is acquired by the conical mirror 23, i.e. by a total circumferential mirror, the procedure including the extraction of the tracking points and the pursuit of the tracking points, etc. are the same as in the embodiment described above.

As the image pickup device 8, an image taking device to take an image over total circumference as commercially available, e.g. a CCD camera, may be used. The image pickup device 8 (CCD camera) is arranged under the conical mirror 23 which has conical shape and acquires images over the circumference as reflected by the conical mirror 23. The position of P where the image is acquired is obtained by the GPS position detecting device 7 mounted above or at a known distance from the conical mirror 23. The moving direction can be obtained from position coordinates of two points detected by the GPS position detecting device 7.

What is claimed is:

1. A position data interpolation method, which interpolates a position data in a zone where position measurement cannot be performed by GPS, comprising:

a step of measuring a position of a mobile object by GPS;

a step of determining a first point and a second point as known points according to measurement results obtained before position measurement cannot be performed in the case that position measurement cannot be performed by GPS;

a step of continuously taking digital images of scenes in the surrounding in a process of moving from a first point, which is a known point, via a second point, which is a known point, to a third point, which is an unknown point;

a step of generating tracking points from an image acquired at the first point, and sequentially specifying the tracking points through the pursuit of points generated on continuously acquired images;

a step of obtaining 3-dimensional position data of the tracking points based on a result of orientation of the tracking points at the first point and at the second point and based on position data of the first point and the second point; and a step of sequentially obtaining a position of the third point based on a result of orientation of the tracking points acquired at the third point and based on 3-dimensional position data of the tracking points.

2. A position data interpolation method, which interpolates a position data in a zone where position measurement cannot be performed by GPS, comprising:

a step of measuring a position of a mobile object by GPS;

a step of determining a first point and a second point as known points according to measurement results obtained before position measurement cannot be performed in the case that position measurement cannot be performed by GPS;

a step of continuously taking digital images of scenes in the surrounding in a process of moving from a first point, which is a known point, via a second point, which is a known point, to a third point, which is an unknown point;

a step of generating tracking points from an image acquired at the first point, and sequentially specifying the tracking points through the pursuit of points generated on continuously acquired images;

a step of obtaining 3-dimensional data of the tracking points on the image acquired at the first point and the image acquired at the second point according to position data of the first point and of the second point, performing relative orientation between the image acquired at the first point and the image acquired at the second point based on the tracking points, and turning to stereo images with 3-dimensional data respectively; and a step of obtaining position data of the third point based on position data of the stereo image and turning the third point to a known point.

3. A position data interpolation method according to claim 1 or 2, wherein position information of the tracking points is obtained based on known information of the first point and of the second point by the method of intersection, and position information of the third point is obtained based on 3-dimensional position data of the tracking points in the image by the method of resection.

4. A position data interpolation method according to claim 1 or 2, wherein images in two or more of directions are continuously acquired, and the tracking points are generated in images at least in one direction.

5. A position data interpolation method according to claim 1 or 2, wherein a retrieval range is set up with the tracking points in a preceding image as the center on a next image data which is acquired subsequently in order of time, and the tracking points in the next image are retrieved within the retrieval range.

6. A position data interpolation method according to claim 1 or 2, wherein back-matching is performed on the tracking points of a preceding image data by using as retrieval target the tracking points specified in a next image which is acquired subsequently in order of time, and the tracking points are deleted in case the tracking points obtained by back-matching do not agree with the tracking points already obtained in the preceding image.

7. A position data interpolation method according to claim 6, wherein an interval of image acquisition is determined to match the moving speed so that the tracking points of the next image are included within the retrieval range.

8. A position measuring device, comprising
a GPS position detecting device,
at least one image pickup device for continuously taking digital images,
an azimuth sensor for detecting an image pickup direction of said image pickup device, and
a measuring device main unit,
wherein said GPS position detecting device measures position data of a first point and of a second point, said image pickup device continuously takes digital images of scenes in the surrounding in a process of moving from a first point, which is a known point, via a second point, which is a known point, to a third point, which is an unknown point, and
wherein said measuring device main unit generates tracking points from the image obtained at the first point, sequentially specifies the tracking points through the pursuit of points generated on the continuously acquired images, calculates 3-dimensional data of the tracking points of the images acquired at the first point and the image acquired at the second point based on position data of the first point and the second point, and calculates position data of the third point based on the position data of the tracking points, and
wherein said measuring device main unit interpolates a position data of said third point by a position data of said third point obtained by arithmetic means in the case that a position measurement of said third point cannot be performed by said GPS position detecting device.

9. A position measuring device according to claim 8, further comprising a total circumferential mirror and an image correcting means, wherein said image pickup device can take images. in total circumferential direction in horizontal direction via said total circumferential mirror, and the images taken are corrected by said image correcting means.

* * * * *